(12) United States Patent
Brown et al.

(10) Patent No.: US 10,351,460 B2
(45) Date of Patent: Jul. 16, 2019

(54) METHODS OF SEPARATING STRENGTHENED GLASS SHEETS BY MECHANICAL SCRIBING

(75) Inventors: James William Brown, Painted Post, NY (US); Cho-Cheng (George) Hsieh, Taipei (TW); Michael Albert Joseph, II, Corning, NY (US); Yen Chia (Gina) Pai, Taichung (TW)

(73) Assignee: CORNING INCORPORATED, Corning, NY (US)

( * ) Notice: Subject to any disclaimer, the term of this patent is extended or adjusted under 35 U.S.C. 154(b) by 1131 days.

(21) Appl. No.: 13/477,391

(22) Filed: May 22, 2012

(65) Prior Publication Data

US 2013/0313301 A1    Nov. 28, 2013

(51) Int. Cl.
  *C03B 33/02*   (2006.01)
  *B26F 3/00*   (2006.01)
  (Continued)

(52) U.S. Cl.
  CPC .............. *C03B 33/023* (2013.01); *B26F 3/00* (2013.01); *C03B 33/107* (2013.01);
  (Continued)

(58) Field of Classification Search
  CPC ... C03B 33/02; C03B 33/023; C03B 33/0235; C03B 33/027; C03B 33/03;
  (Continued)

(56) References Cited

U.S. PATENT DOCUMENTS

| 3,464,880 A | 9/1969 | Rinehart |
| 3,865,673 A | 2/1975 | DeTorre |

(Continued)

FOREIGN PATENT DOCUMENTS

| CN | 1252390 | 5/2000 | |
| CN | 1437018 A | 8/2003 | ........... G01N 27/447 |

(Continued)

OTHER PUBLICATIONS

Office Action dated Feb. 14, 2014 filed in European Patent Application No. 11711203.7.
(Continued)

*Primary Examiner* — Phong H Nguyen
(74) *Attorney, Agent, or Firm* — Dinsmore & Shohl LLP

(57) ABSTRACT

A method of separating a strengthened glass sheet includes positioning a serrated scribing wheel at a position spaced apart from a first edge of the glass sheet and offset below a top surface of the glass sheet, where the glass sheet comprises a surface compression layer of layer depth DOL and a central region. The method also includes translating the serrated scribing wheel in a first direction at an initiation speed such that the serrated scribing wheel forms a crack initiation site comprising surface indentations extending into the surface compression layer, accelerating the serrated scribing wheel in the first direction from the initiation speed to a scoring speed to scribe a score line extending into the glass sheet to a median crack depth greater than DOL, and stopping the serrated scribing wheel in the first direction before the score line reaches a second edge of the glass sheet.

19 Claims, 7 Drawing Sheets

(51) Int. Cl.
*C03B 33/023* (2006.01)
*C03B 33/10* (2006.01)
*C03C 21/00* (2006.01)

(52) U.S. Cl.
CPC .......... *C03C 21/002* (2013.01); *C03B 33/105* (2013.01); *Y10T 83/0341* (2015.04); *Y10T 225/12* (2015.04)

(58) Field of Classification Search
CPC ..... C03B 33/037; C03B 33/07; C03B 33/074; C03B 33/076; C03B 33/10; C03B 33/105; C03B 33/107; Y10T 225/10; Y10T 225/12; Y10T 225/14; Y10T 225/16; Y10T 225/18; Y10T 225/321; Y10T 225/329; Y10T 225/371; Y10T 83/0207; Y10T 83/0215; Y10T 83/0222; Y10T 83/0333; Y10T 83/0341; Y10T 83/0348; Y10T 83/0356; Y10T 83/0363; Y10T 83/037; Y10T 83/0385; Y10T 83/04; B26D 3/08; B26F 3/00
USPC ........ 225/1–5, 93, 96, 97, 103; 83/862–864, 83/879–884, 886, 13
See application file for complete search history.

(56) References Cited

U.S. PATENT DOCUMENTS

| | | | |
|---|---|---|---|
| 3,880,337 | A | 4/1975 | Augustin et al. |
| 3,956,547 | A | 5/1976 | DeTorre |
| 3,959,000 | A | 5/1976 | Nakagawa et al. |
| 4,057,184 | A | 11/1977 | Michalik |
| 4,289,261 | A | 9/1981 | Dahlberg |
| 4,341,139 | A | 7/1982 | DeTorre |
| 4,427,143 | A | 1/1984 | Hyatt |
| 4,487,350 | A | 12/1984 | DeTorre |
| 5,016,800 | A | 5/1991 | Sato et al. |
| 5,871,134 | A * | 2/1999 | Komagata et al. ............... 225/2 |
| 6,222,604 | B1 | 4/2001 | Suginoya et al. |
| 6,402,004 | B1 | 6/2002 | Yoshikuni et al. |
| 6,412,677 | B1 | 7/2002 | Yoshikuni et al. |
| 6,818,576 | B2 | 11/2004 | Ikenishi et al. |
| 7,131,562 | B2 | 11/2006 | Ueyama |
| 7,439,665 | B2 | 10/2008 | Wakayama |
| 7,523,846 | B2 | 4/2009 | Takamatsu |
| 7,553,390 | B2 | 6/2009 | Yamabuchi et al. |
| 8,720,228 | B2 | 5/2014 | Li |
| 2002/0110706 | A1 | 8/2002 | Miyamoto |
| 2003/0194583 | A1 | 10/2003 | Miyamoto |
| 2004/0040997 | A1 * | 3/2004 | Ueyama ............... B28D 5/0011 225/96.5 |
| 2004/0155085 | A1 * | 8/2004 | Takamatsu et al. ............... 225/2 |
| 2004/0187659 | A1 | 9/2004 | Nishiyama |
| 2005/0032623 | A1 | 2/2005 | Araujo et al. |
| 2005/0056127 | A1 | 3/2005 | Yamabuchi et al. |
| 2005/0221044 | A1 | 10/2005 | Gaume et al. |
| 2005/0258135 | A1 | 11/2005 | Ishikawa et al. |
| 2006/0042433 | A1 | 3/2006 | Maekawa et al. |
| 2006/0137505 | A1 | 6/2006 | Wakayama |
| 2007/0151962 | A1 | 7/2007 | Doll et al. |
| 2008/0217311 | A1 | 9/2008 | Eberhardt et al. |
| 2008/0264994 | A1 | 10/2008 | Herve et al. ............... 225/2 |
| 2008/0311817 | A1 * | 12/2008 | Kawamoto ............... C03B 33/023 445/24 |
| 2009/0156081 | A1 * | 6/2009 | Kirihara ............... C03B 33/03 445/2 |
| 2009/0201444 | A1 | 8/2009 | Yamabuchi et al. |
| 2009/0262092 | A1 | 10/2009 | Halsey, IV et al. ............... 345/173 |
| 2010/0119846 | A1 | 5/2010 | Sawada |
| 2010/0170558 | A1 | 7/2010 | Stein ............... 136/244 |
| 2010/0210442 | A1 | 8/2010 | Abramov et al. |
| 2010/0272134 | A1 | 10/2010 | Blanding et al. ............... 372/22 |
| 2011/0017713 | A1 | 1/2011 | Abramov et al. ........ 219/121.67 |
| 2011/0049765 | A1 * | 3/2011 | Li ............... C03B 33/093 264/400 |
| 2011/0127242 | A1 | 6/2011 | Li |
| 2011/0183116 | A1 | 7/2011 | Hung et al. |
| 2011/0226832 | A1 * | 9/2011 | Bayne ............... B28D 5/0011 225/2 |
| 2012/0011981 | A1 | 1/2012 | Brown |
| 2012/0012632 | A1 | 1/2012 | Tominaga et al. |
| 2012/0329525 | A1 | 12/2012 | Hashimoto et al. |
| 2013/0224439 | A1 * | 8/2013 | Zhang ............... C03B 33/0222 428/157 |

FOREIGN PATENT DOCUMENTS

| | | | |
|---|---|---|---|
| CN | 1930097 | 3/2007 | |
| CN | 101544029 A | 9/2009 | |
| CN | 101605840 A | 12/2009 | ............... C08J 3/22 |
| CN | 101687686 A | 3/2010 | ............ C03B 33/09 |
| CN | 101962262 A | 2/2011 | ............ C03B 33/09 |
| CN | 101579854 | 7/2011 | |
| CN | 201890842 U | 7/2011 | ............ C03B 33/02 |
| EP | 1491309 A1 | 12/2004 | |
| GB | 2165174 | 4/1986 | |
| JP | 2000247671 A | 9/2000 | |
| JP | 2001255504 A | 9/2001 | |
| JP | 2002167230 A | 6/2002 | |
| JP | 2002-308637 | * 10/2002 | |
| JP | 2003292332 | 10/2003 | |
| JP | 2004083378 A | 3/2004 | |
| JP | 2008007384 A | 1/2008 | |
| JP | 2008247732 | 8/2008 | |
| JP | 2008260754 A | 10/2008 | |
| JP | 2011/26193 | 2/2011 | ........... C03B 33/037 |
| JP | 2012000792 A | 1/2012 | |
| JP | 2012031018 A | 2/2012 | |
| JP | 2012072002 A | 4/2012 | |
| KR | 20050016393 A | 2/2005 | |
| KR | 2011/0009639 | 1/2011 | ............ C03B 33/02 |
| TW | 491817 B | 6/2002 | |
| TW | 200902467 | 1/2009 | |
| TW | 200936519 A | 9/2009 | |
| TW | 201107257 | 3/2011 | ............ C03B 33/09 |
| TW | 2011227763 | 8/2011 | |
| TW | 201139310 A | 11/2011 | |
| TW | 201217285 A | 5/2012 | |
| WO | WO2007/094348 | * 2/2007 | |
| WO | 2008/100331 | 8/2008 | ............... C08J 3/22 |
| WO | 2008/133800 | 11/2008 | ............ C03B 33/09 |
| WO | 2011/084561 | 7/2011 | ............ B65G 49/06 |
| WO | 2011/116165 | 9/2011 | ........... C03B 33/023 |

OTHER PUBLICATIONS

Office Action dated Apr. 9, 2014 filed in U.S. Appl. No. 13/935,085.
International Search Report and Written Opinion; PCT/US2011/043510 filed Jul. 11, 2011; ISR dated Jun. 10, 2011.
International Search Report and Written Opinion; PCT/US2011/028777 filed Mar. 11, 2011; ISR dated Jul. 21, 2011.
European Patent Office Communication pursuant to Rules 161(1) and 162 EPC; EP Application No. 11738888.4.
International Search Report & Written Opinion filed in PCT/US2013/041591 filed May 17, 2013; ISR dated Aug. 21, 2013.
Chinese Office Action filed in Patent Application No. 201180014471.2 dated Jul. 2, 2014.
Advisory Action filed in U.S. Appl. No. 13/050,281 dated Jul. 25, 2014.
Glass Basics: Scoring and Separating Recommendations, Technical Information Paper, Corning Display Technologies copyright 2004, available at (Jan. 15, 2015): http://pdf.directindustry.com/pdf/corning-display-technologies/glass-basics-scoring-separating-recommendations/57416-562792.html.
Visiontek Systems Ltd., "Glass", Jun. 8, 2002, http://visionteksystems.co.uk/glass.htm.
B. R. Lawn and D. B. Marshall, "Compact Fracture Resistance of Physically and Chemically Tempered Glass Plates: A V Theoretical Model", Feb. 1977, Physics and Chemistry of Glasses, vol. 18, No. 1, pp. 7-18.

(56) References Cited

OTHER PUBLICATIONS

Lema, Parma. "The Glass Chemical Tempering Process" May 1, 2005, http://www.allbusiness.com/nonmetallic-mineral/glass-glass-manufacturing/468622-1.html.
Corning Incorporated, "Corning Gorilla Glass," Aug. 2008, http://pdf.directindustry.com/pdf/corning/gorilla-glass-product-information-sheet/12631-67069-_2.html.
English Translation of CN201380035076.1 First Office Action dated May 30, 2016; Chinese Patent Office; China.
Taiwanese Search Report issued in TW Application No. 102118081 dated Mar. 15, 2017, 1 page.
English Translation of JP2015514069 Office Action dated Apr. 11, 2017; 6 Pages; Japanese Patent Office.

\* cited by examiner

METHODS OF SEPARATING STRENGTHENED GLASS SHEETS BY MECHANICAL SCRIBING

BACKGROUND

Field

The present disclosure generally relates to methods of separating strengthened glass sheets by mechanical scribing and, more particularly, one-step methods of separating strengthened glass sheets using a mechanical scribe.

Technical Background

Glass sheets are used in a variety of industries including the electronics industry where glass is used to cover displays. Examples of such applications include Liquid Crystal Displays (LCDs) and Light Emitting Diode (LED) displays such as, for example, computer monitors, televisions, and handheld devices. Conventionally, glass has been produced in large sheets and is scored using a mechanical scoring wheel or a laser. After being scored, an external force is applied to the glass sheet to break the glass along the score line. With the glass portioned into smaller sizes, the glass partitions undergo further processing including, for example, edge polishing and/or a chemical strengthening process.

Processing glass according to the conventional method has proven burdensome. When glass is broken along the score line by an application of force, the application of force tends to damage the glass portions, which may increase scrap rate. Further, for chemically strengthened glass, introducing the glass portions to the chemical strengthening process after scoring decreases throughput, as the smaller glass portions require increased operator intervention as compared to processing a larger glass sheet.

Accordingly, methods of separating strengthened glass sheets by mechanical scribing are needed.

SUMMARY

According to various embodiments, a method of separating a strengthened glass sheet includes positioning a serrated scribing wheel at a position spaced apart from a first edge of the glass sheet and offset below a top surface of the glass sheet, where the glass sheet is an ion-exchanged glass sheet having a first strengthened surface layer and a second strengthened surface layer under a compressive stress. The first and second strengthened surface layers extend from a surface of the ion-exchanged glass sheet to a depth of layer DOL, and a central region between the first strengthened surface layer and the second strengthened surface layer is under tensile stress. The method also includes translating the serrated scribing wheel in a first direction at an initiation speed such that the serrated scribing wheel forms a crack initiation site comprising surface indentations extending into the first strengthened surface layer, accelerating the serrated scribing wheel in the first direction from the initiation speed to a scoring speed to scribe a score line extending into the glass sheet to a median crack depth greater than DOL, and stopping the serrated scribing wheel in the first direction before the score line reaches a second edge of the glass sheet. The method further includes positioning the serrated scribing wheel at a position spaced apart from a third edge of the glass sheet and offset below the top surface of the glass sheet, translating the serrated scribing wheel in a second direction transverse to the first direction at a cross-cut initiation speed such that the serrated scribing wheel forms a cross-cut crack initiation site comprising surface indentations extending into the first strengthened surface layer, and accelerating the serrated scribing wheel in the second direction from the cross-cut initiation speed to a cross-cut scoring speed to scribe a cross-cut score line extending into the glass sheet to a cross-cut median crack depth.

According to further embodiments, a method of separating a strengthened glass sheet includes positioning a serrated scribing wheel at a position spaced apart from a first edge of the glass sheet and offset below a top surface of the glass sheet, where the glass sheet is an ion-exchanged glass sheet having a first strengthened surface layer and a second strengthened surface layer under a compressive stress. The first and second strengthened surface layers extend from a surface of the ion-exchanged glass sheet to a depth of layer DOL, and a central region between the first strengthened surface layer and the second strengthened surface layer is under tensile stress. The method also includes translating the serrated scribing wheel in a first direction at an initiation speed such that the serrated scribing wheel forms a crack initiation site comprising surface indentations extending into the first strengthened surface layer, accelerating the serrated scribing wheel in the first direction from the initiation speed to a scoring speed to scribe a score line extending into the glass sheet to a median crack depth greater than DOL, and stopping the serrated scribing wheel in the first direction before the score line reaches a second edge of the glass sheet. The score line is completed in a score time measured from when the serrated scribing wheel contacts the glass sheet to when the serrated scribing wheel is stopped, and the score line grows through the central region after the score time. The method further includes positioning the serrated scribing wheel at a position spaced apart from a third edge of the glass sheet and offset below the top surface of the glass sheet, translating the serrated scribing wheel in a second direction transverse to the first direction at a cross-cut initiation speed such that the serrated scribing wheel forms a cross-cut crack initiation site comprising surface indentations extending into the first strengthened surface layer, and accelerating the serrated scribing wheel in the second direction from the cross-cut initiation speed to a cross-cut scoring speed to scribe a cross-cut score line extending into the glass sheet to a cross-cut median crack depth.

According to still further embodiments, a method of scoring a strengthened glass sheet includes positioning a serrated scribing wheel at a position spaced apart from a first edge of the glass sheet and offset below a top surface of the glass sheet, where the glass sheet comprises a surface compression layer of depth DOL and a central region. The method also includes translating the serrated scribing wheel in a first direction at an initiation speed such that the serrated scribing wheel forms a crack initiation site comprising surface indentations extending into the surface compression layer, accelerating the serrated scribing wheel in the first direction from the initiation speed to a scoring speed to scribe a score line extending into the glass sheet to a median crack depth greater than DOL, and stopping the serrated scribing wheel in the first direction before the score line reaches a second edge of the glass sheet. The score line is completed in a score time measured from when the serrated scribing wheel contacts the glass sheet to when the serrated scribing wheel is stopped, and the score line grows through the central region after the score time.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description described various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
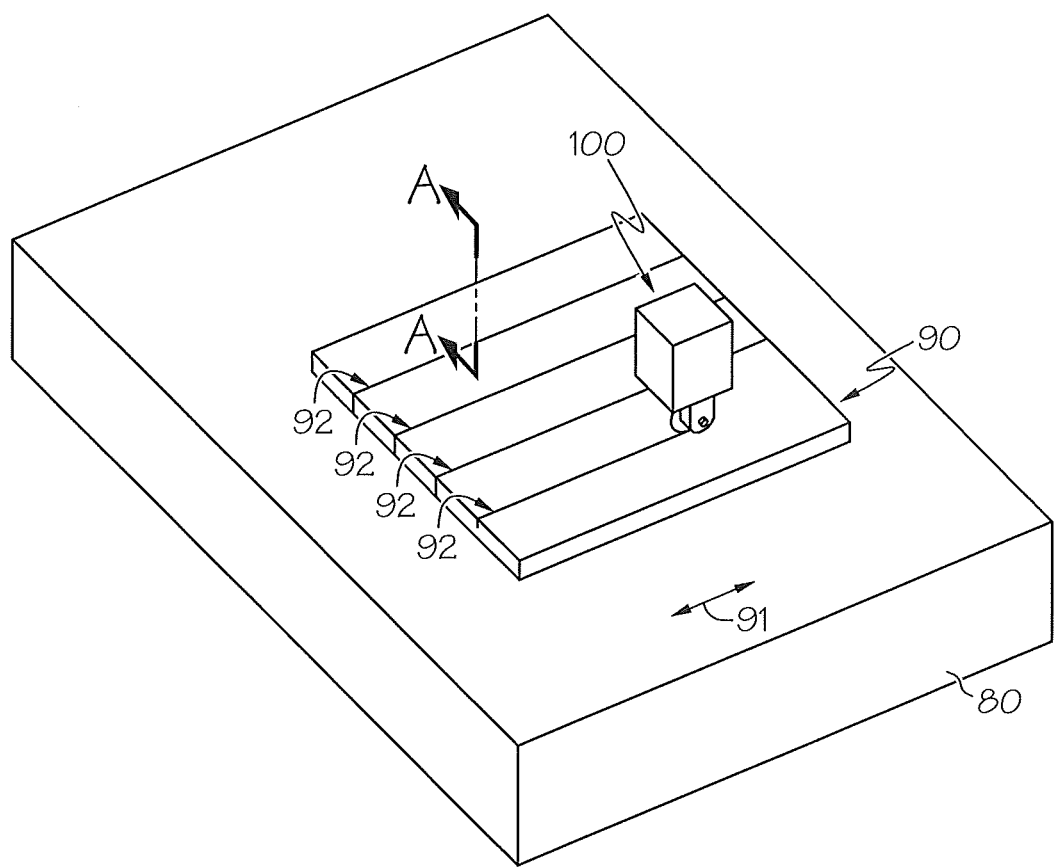
FIG. 1 schematically depicts a perspective view of a scoring mechanism mechanically scoring a glass sheet in a first direction according to one or more embodiments shown or described herein.
Figure 2:
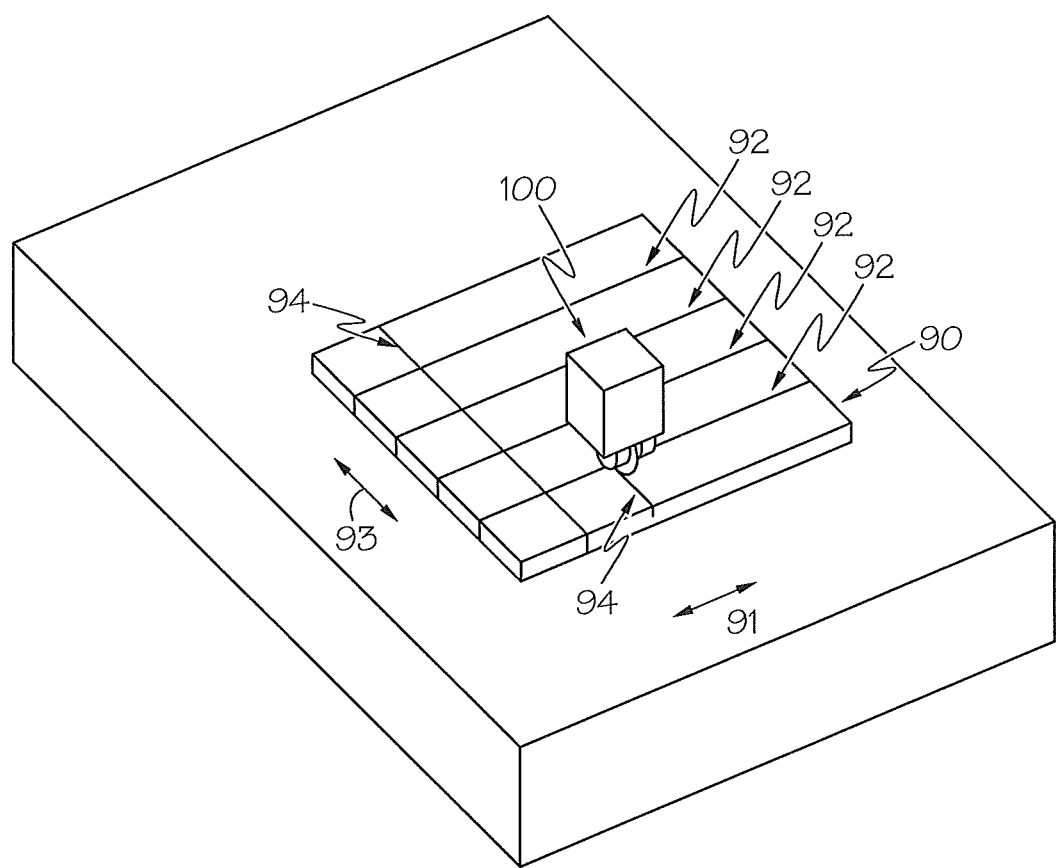
FIG. 2 schematically depicts a perspective view of a scoring mechanism mechanically scoring a glass sheet in a second direction according to one or more embodiments shown or described herein.

Reference will now be made in detail to embodiments of methods of separating strengthened glass sheets by mechanical scribing, examples of which are illustrated in the accompanying drawings. Whenever possible, the same reference numerals will be used throughout the drawings to refer to the same or like parts. One embodiment of the method of separating a strengthened glass sheet by mechanical scribing is depicted in FIGS. 1 and 2. The mechanical scribe, here a serrated scribing wheel, is initially positioned away from an edge of the strengthened glass sheet and is translated towards the glass sheet in an edge crash mode that forms a crack initiation site. The mechanical scribe is accelerated and translates along the strengthened glass sheet, and is stopped before reaching a second edge of the glass sheet. As the mechanical scribe translates along the strengthened glass sheet, the mechanical scribe forms a score line that extends a median crack distance through a thickness of the glass. The score line continues to grow through the thickness of the glass sheet forming a through-body crack, and also includes an unseparated portion that maintains some structural rigidity of the glass sheet. The mechanical scribe is then positioned to scribe the strengthened glass sheet in a second direction transverse to the first direction, forming cross-cut score lines and portioning the strengthened glass sheet into a plurality of glass articles as the cross-cut score lines grow through thickness of the glass sheet. Methods of separating strengthened glass will be described in more detail herein with specific reference to the appended drawings.

As used herein, the phrase "frangibility depth" refers to the depth a defect extends into a glass sheet that causes the glass to energetically fragment into a large number of small pieces without further application of force.

Chemically strengthened glass sheets are essentially glass substrates incorporating engineered stress profiles across their thicknesses, with surface portions of the sheets being brought to high levels of compressive stress, and interior portions into tensile stress, in the course of chemical strengthening. The scoring of such sheets utilizing techniques developed for the separation of large glass sheets such as those used for LCD display substrates typically leads to glass cracking. According to theory, when a scoring force is applied to an ion-exchanged chemically-strengthened glass article that is adequate to overcome the surface compressive stress and initiate mediate cracking into the tensilely stressed interior of the article, the crack propagates uncontrollably to cause spontaneous breakage of the article. In accordance with the embodiments disclosed herein, however, a serrated scribing wheel with an appropriate geometry is used to initiate controlled mechanical damage that overcomes the residual surface compressive stress without undesired sheet separation or breakage.

Referring now to FIG. 1, a strengthened glass sheet 90 is positioned on a table 80. The strengthened glass sheet 90 may substantially be in contact with the table 80. However, due to variations in the glass sheet 90, portions of the glass sheet 90 may be spaced apart from the support table 80. A scribing mechanism 100 is depicted as being positioned proximate to the glass sheet 90 such that the scribing mechanism 100 forms a plurality of score lines 92 that extend in a first direction 91. After the plurality of score lines 92 are formed in the glass sheet 91 in the first direction 91, the scribing mechanism 100 is positioned to form a plurality of cross-cut score lines 94 in the second direction 93 transverse to the first direction 91, as depicted in FIG. 2.

Figure 3:
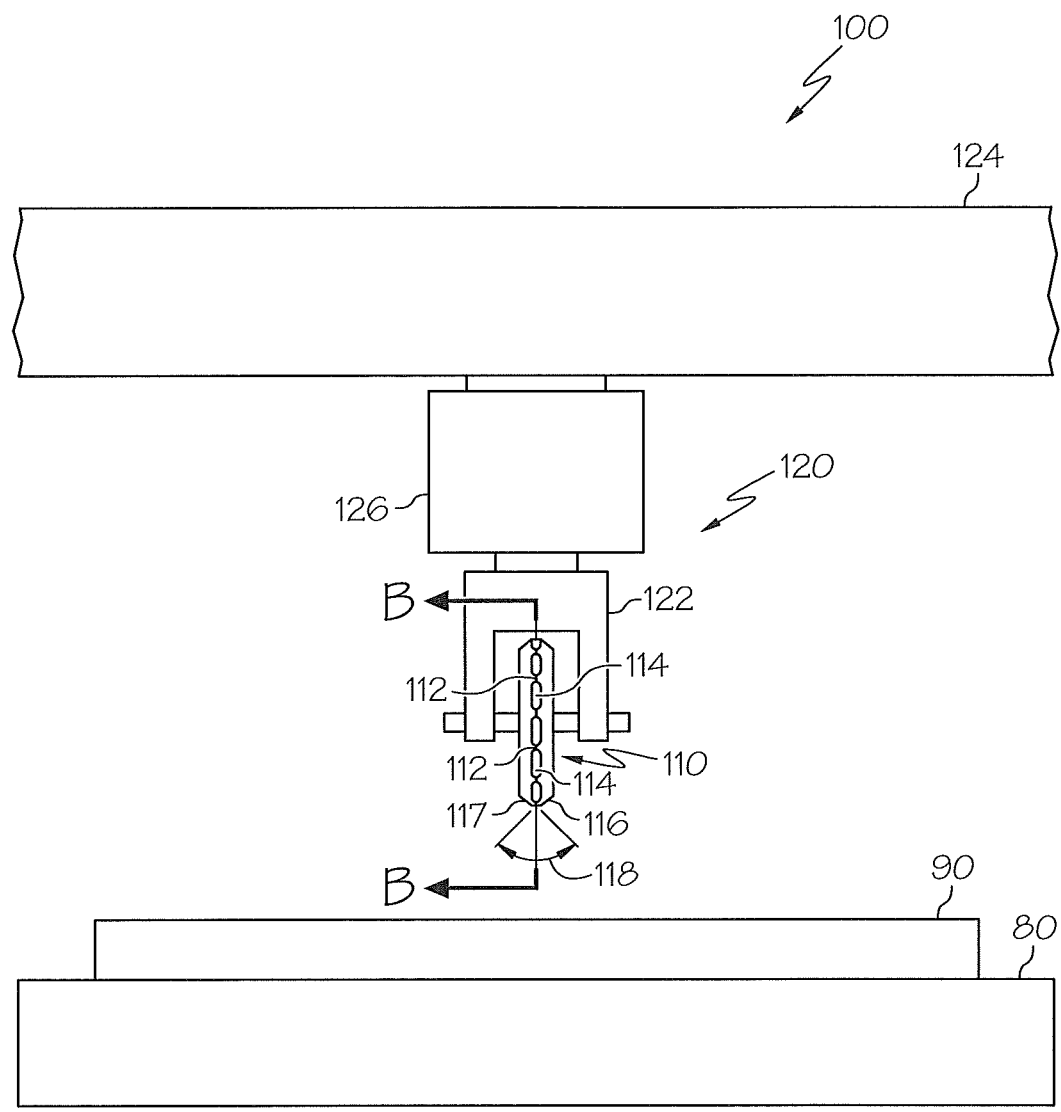
FIG. 3 schematically depicts a front view of a scoring mechanism for mechanically scoring a glass sheet according to one or more embodiments shown or described herein.
Figure 4:
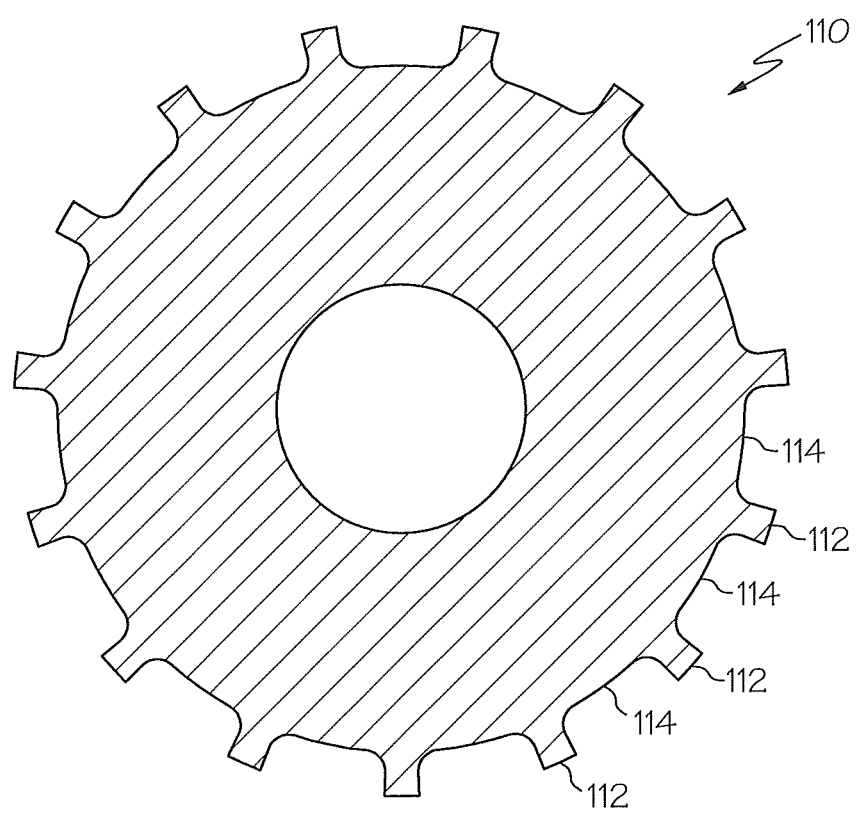
FIG. 4 schematically depicts a right sectional view along line B-B of FIG. 3 of the serrated scoring wheel according to one or more embodiments shown or described herein.

Referring now to FIGS. 3 and 4, a portion of the scribing mechanism 100 is depicted. The scribing mechanism 100 includes a serrated scribing wheel 110 positioned to extend distally from a support structure 122 of a scribing head 120. The serrated scribing wheel 110 includes a plurality of serrations 114 that extend inward from the contact surfaces 112. The contact surfaces 112 are formed by two peripheral surfaces 116, 117 that converge at a wheel tip angle 118. The serrated scribing wheel 110 may be made from a variety of materials suitable for creating defects in the glass sheet 90. Examples of such materials include, without limitation, tungsten carbide and synthetic sintered diamond.

A variety of configurations of the serrated scribing wheel 110 may be suitable for forming the score lines 92 and the cross-cut score lines 94 in the glass sheet 90 based on the composition and strength of the glass sheet 90. Such serrated scribing wheels 110 may be commercially available, as an example and not a limitation, the "Micro Penett" line of wheels from Mitsuboshi Diamond Industrial Co., Ltd. Of Osaka, Japan. In one exemplary embodiment, the serrated scribing wheel 110 is made from polycrystalline diamond and has a outer diameter, as evaluated along the contact surfaces 112, of about 2 mm, a wheel tip angle 118 of about 110 degrees, and about 360 serrations 114 around the outer diameter, where the radial distance between the bottom of the serration 114 and the top of the contact surface 112 is about 3 µm.

Referring again to FIG. 3, the scribing mechanism 100 includes a scribing head 120 positioned along a gantry system 124. The scribing head 120 positions the serrated scribing wheel 110 proximate to the glass sheet 90 such that the serrated scribing wheel 110 contacts the glass sheet. The serrated scribing wheel 110 is mounted in the scribing head 120 such that the serrated scribing wheel 110 is free to rotate about its centerline as the contact surfaces 112 of the serrated scribing wheel 110 contact the glass sheet 90. The scribing head 120 includes a force application mechanism 126 that controls the force with which the serrated scribing wheel 110 is held against the glass sheet 90. The force application mechanism 126 can vary the force applied to the serrated scribing wheel 110 while forming a single score line 92. The force application mechanism 126 may use a variety of force-application methods to control the force applied to the serrated scribing wheel 110 including, but not limited to, pneumatic actuators, spring tensioners, and servo actuators known in the art.

The gantry system 124 of the scribing mechanism 100 translates the scribing head 120 at a speed and a direction along the glass sheet 90 as to form the score lines 92 and the cross-cut score lines 94 in the glass sheet 90. The speed at which the gantry system 124 translates the scribing head 120 may increase or decrease while continuing to translate the scribing head 120 to form a single score line 92.

Referring now to FIGS. 5-9, the process of using the serrated scribing wheel 110 in the scribing mechanism 100 to form a score line 92 is depicted. The mechanical scribing method described herein is used to score glass sheets 90 made of strengthened glass. The glass sheet 90 may be chemically strengthened by an ion-exchange process to produce a first strengthened surface layer 142 and a second strengthened surface layer 144 that are both subject to internal compressive stresses. The first and second strengthened surface layers 142, 144 are separated from one another by a central region 146 subject to internal tensile stress. The first and second strengthened surface layers 142, 144 extend to a depth of layer DOL. For purposes of description, the glass sheet 90 described herein is positioned such that the second strengthened surface layer 144 contacts the support table 80, and that the first strengthened surface layer 142 is positioned as the top surface 96.

Figure 5:
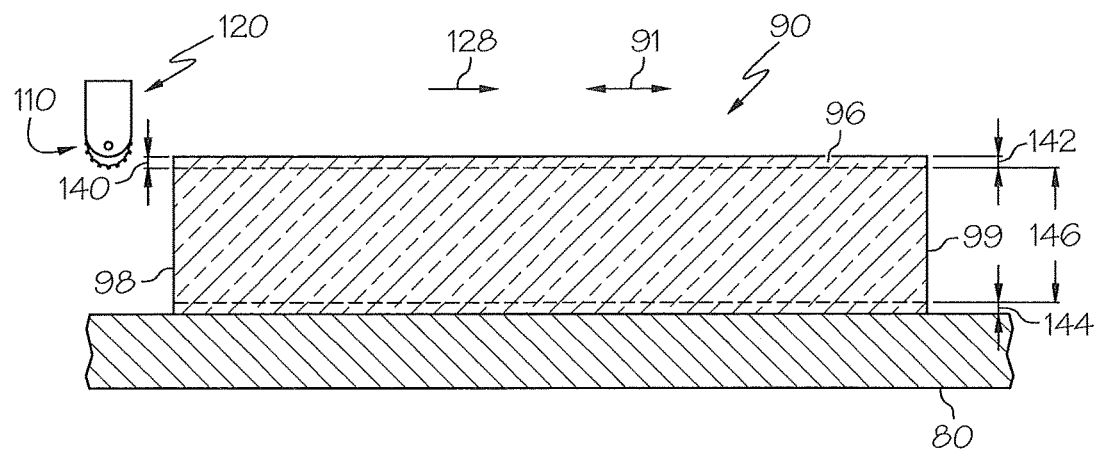
FIG. 5 schematically depicts a right sectional view along line A-A of FIG. 1 of the mechanical scoring process according to one or more embodiments shown or described herein.

Referring to FIG. 5, the scribing head 120 is positioned such that the serrated scribing wheel 110 is offset in the scoring direction 128 from the glass sheet 90 at time $t_0$. The serrated scribing wheel 110 is also offset vertically from the top surface 96 of the glass sheet 90. The vertical distance between the bottom of the serrated scribing wheel 110 and the top surface 96 of the glass sheet 90 is defined as the incision depth 140. In some embodiments, the incision depth 140 is set from about 20% to about 25% of the glass sheet 90 thickness. For example, when scoring glass sheets 90 having a thickness of about 0.5 millimeter, the serrated scribing wheel 110 is positioned such that the lowest-positioned contact surface 112 of the serrated scribing wheel 110 is from about 0.1 millimeter to about 0.125 millimeter below the top surface 96 of the glass sheet 90.

Figure 6:
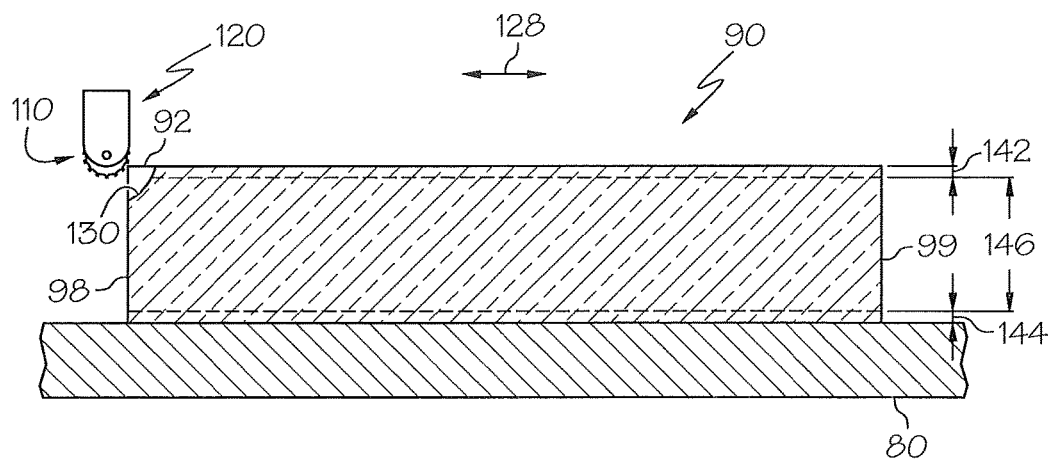
FIG. 6 schematically depicts a right sectional view along line A-A of FIG. 1 of the mechanical scoring process during an edge crash mode at a time period subsequent to the time shown in FIG. 5 according to one or more embodiments shown or described herein.

The gantry system 124 (not shown in FIGS. 5-9) of the scribing mechanism 100 translates the scribing head 120 towards the glass sheet 90 such that the serrated scribing wheel 110 contacts a first edge 98 of the glass sheet 90, at time $t_1$, subsequent to time $t_0$, as depicted in FIG. 6. As the contact surfaces 112 of the serrated scribing wheel 110 contact the first edge 98 of the glass sheet 90 and are translated along the top surface 96 of the glass sheet 90, force is applied by the force application mechanism 126, such that the serrated scribing wheel 110 translates vertically from the incision depth 140 towards the top surface 96 of the glass sheet 90. In some embodiments, the normal force applied to the serrated scribing wheel 110 is held constant during the scoring process by the force application mechanism 126. For example, the normal force may be held from about 3 Newtons to about 6 Newtons.

Figure 7:
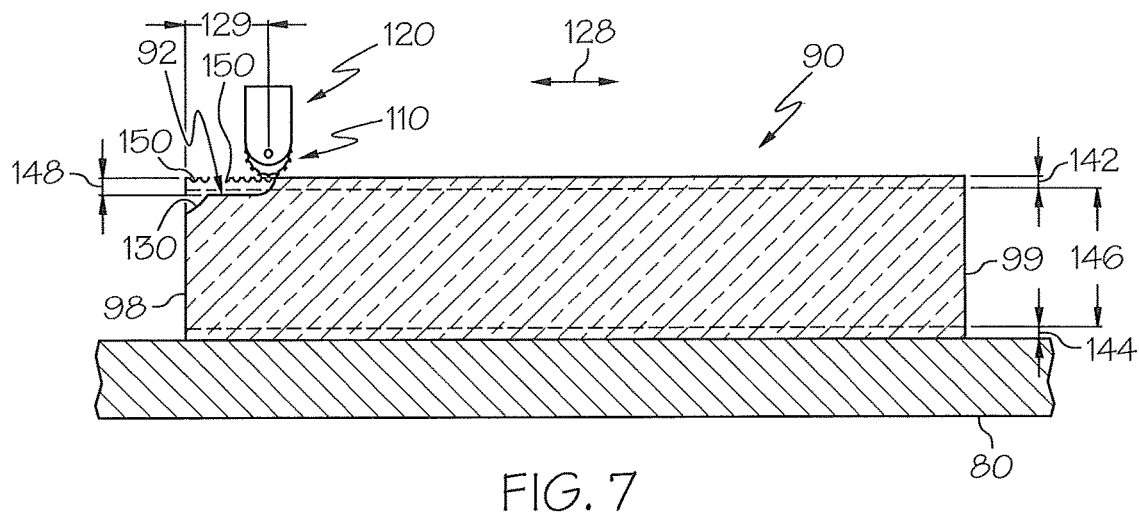
FIG. 7 schematically depicts a right sectional view along line A-A of FIG. 1 of the mechanical scoring process at a time period subsequent to the time shown in FIG. 6 according to one or more embodiments shown or described herein.

The scribing head 120 translates at an initiation speed in the scoring direction 128 longitudinally along the top surface 96 of the glass sheet 90 for an engagement distance 129 (FIG. 7). The initiation speed is slower than the scoring speed, as will be described in greater detail below. In some embodiments, the scribing head 120 translates at a speed that is from about 2 times the serrated scribing wheel 110 diameter per second to about 10 times the serrated scribing wheel 110 diameter per second. For example, for a serrated scribing wheel 110 having a diameter of about 3 millimeters, the scribing head 120 translates at an initiation speed from about 6 millimeters per second to about 30 millimeters per second. In some embodiments, the engagement distance 129 is from about 2 times the serrated scribing wheel 110 diameter to about 4 times the serrated scribing wheel 110 diameter. For example, when using a serrated scribing wheel 110 having a diameter of 3 millimeters, the engagement distance 129 is from about 6 millimeters to about 12 millimeters.

Translating the serrated scribing wheel 110 into the first edge 98 of the glass sheet 90 and allowing the serrated scribing wheel 110 to translate vertically upwards such that the contact surfaces 112 contact the top surface 96 of the glass sheet 90 is referred to herein as the "edge crash" mode of initiating cracks into the glass sheet 90. The edge crash mode forms a crack initiation site 130 in the top surface 96 of the glass sheet 90.

Referring now to FIG. 7, the scribing head 120 is depicted at time $t_2$ subsequent to time $t_1$ in a position such that the serrated scribing wheel 110 is contacting the top surface 96 of the glass sheet 90, and spaced apart from the first edge 98 of the glass sheet 90. As depicted, potions of the glass sheet 90 proximate to the first edge 98 exhibit a crack initiation site 130 extending from both the first edge 98 and the top surface 96. This crack initiation site 130 extends through the first strengthened layer of the glass sheet 90 proximate to the top surface 96. Once the serrated scribing wheel 110 has been translated to a vertical position such that the contact surfaces 112 contact the top surface 96 of the glass sheet 90 (see FIG. 3), the scribing head 120 accelerates from the initiation speed exhibited in the edge crash mode to a scoring speed. In some embodiments, the scoring speed is from about 50 times the serrated scribing wheel 110 diameter per second to about 100 times the serrated scribing wheel 110 diameter per second. For example, for a serrated scribing wheel 110 having a diameter of about 3 millimeters, the scoring speed is from about 150 millimeters per second to about 300 millimeters per second. The scribing head 120 accelerates the serrated scribing wheel 110 and translates the serrated scribing wheel 110 along the glass sheet 90 such that the serrated scribing wheel 110 forms the score line 92. The score line 92 extends to a median crack depth 148 into the glass sheet 90, such that the median crack depth 148 is greater than the depth of layer of the glass sheet 90. In a time interval in which the serrated scribing wheel 110 is positioned proximate to a given fixed position, or a "local area of interest," the median crack depth 148 of the score line 92 is less than the frangibility depth of the glass sheet 90, the depth at which the glass sheet 90 is spontaneously frangible and prone to break into pieces in orientations away from the score line 92.

The contact surfaces 112 of the serrated scribing wheel 110 induce a pattern of surface indentations 150 into the top surface 96 of the glass sheet 90. The size of and the spacing between the surface indentations 150 correspond to the contact surfaces 112 and the serrations 114 of the serrated scribing wheel 110. As the serrated scribing wheel 110 translates along the top surface 96 of the glass sheet 90, the serrated scribing wheel 110 induces a stress field into the glass sheet 90. The stress field is highest in areas of the glass sheet 90 that contact the contact surfaces 112 of the serrated scribing wheel 110 (see FIGS. 3 and 4), which causes the surface indentations 150 in the glass sheet 90. The stress field dissipates between the surface indentations 150 and at positions spaced away from the surface indentations 150 along the top surface 96 of the glass sheet 90 and into the depth of the glass sheet 90. The stress field causes the formation of the score line 92 to the median crack depth 148 from the top surface 96 of the glass sheet 90. By controlling the force with which the serrated scribing wheel 110 is held against the top surface 96 of the glass sheet 90, the depth of the surface indentations 150 created by the serrated scribing wheel 110 can be controlled such that the score line 92 is formed to a desired median crack depth 148.

Figure 8:
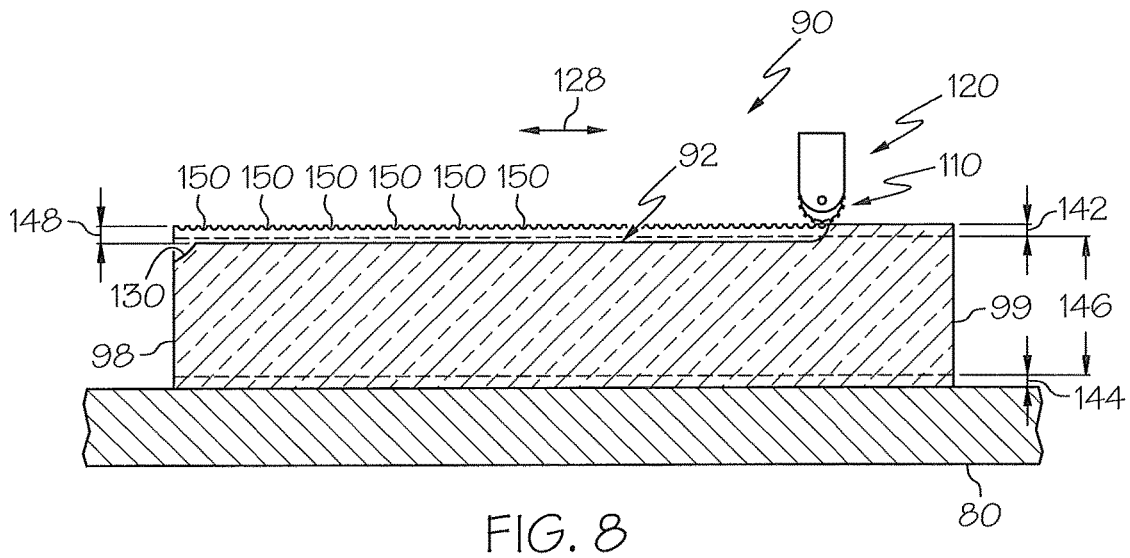
FIG. 8 schematically depicts a right sectional view along line A-A of FIG. 1 of the mechanical scoring process at a time period subsequent to the time shown in FIG. 7 according to one or more embodiments shown or described herein.

Referring now to FIG. 8, at time $t_3$ subsequent to time $t_2$, the scribing head 120 continues to translate the serrated scribing wheel 110 along the top surface 96 of the glass sheet 90 until the serrated scribing wheel 110 approaches a second edge 99 of the glass sheet 90 opposite the first edge 98. As the serrated scribing wheel 110 approaches the second edge 99, the scribing head 120 stops, and the force application mechanism 126 relieves force from the serrated scribing wheel 110. In some embodiments, the termination distance 127 (FIG. 9) between the second edge 99 of the glass sheet 90 and the stopping point of the serrated scribing wheel 110 is at least 1 diameter of the serrated scribing wheel 110. For example, when using a serrated scribing wheel 110 having a diameter of 3 millimeters, the termination distance 127 is at least 3 millimeters. The time period in which the single score line 92 is formed, beginning with the serrated scribing wheel 110 edge crashing the glass sheet 90 and ending when force is removed from the glass sheet 90 by the serrated scribing wheel 110 at the termination distance 127, is defined as the score time.

Figure 9:
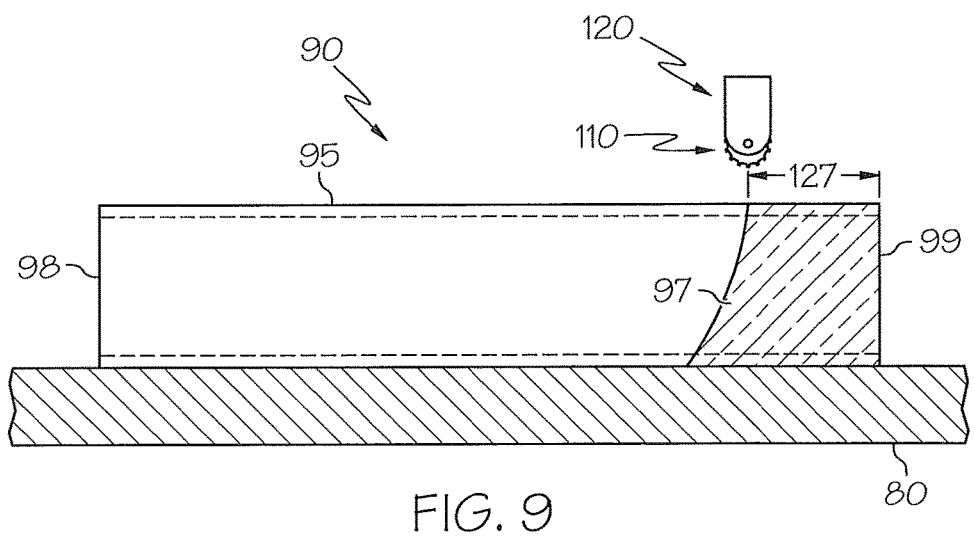
FIG. 9 schematically depicts a right sectional view along line A-A of FIG. 1 of the mechanical scoring process at a time period subsequent to the time shown in FIG. 8 according to one or more embodiments shown or described herein.

As depicted in FIG. 9 at time $t_4$ subsequent to time $t_3$, the scribing head 120 translates the serrated scribing wheel 110 vertically away from the top surface 96 of the glass sheet 90 such that the contact surfaces 112 are no longer in contact with the glass sheet 90. By stopping the serrated scribing wheel 110 at the termination distance 127 spaced apart from the second edge 99 of the glass sheet 90, portions of the glass sheet 90 proximate to the second edge 99 remain unscored, and therefore portions of the glass sheet 90 proximate to the second edge 99 maintain structural integrity for handling or subsequent scoring operations. However the score line 92 continues to grow through the thickness of the glass sheet 90 after the score time.

As the serrated scribing wheel 110 translates away from the local area of interest in the glass sheet 90, the residual stresses in the stress field dissipate over time as the stress field in regions of the glass sheet 90 proximate to the score line 92 relax. The dissipation of the stress field may be attributed to redistribution of stresses in the glass sheet 90 following formation of the surface indentations 150. As the serrated scribing wheel 110 is translated away from the local area of interest, the stress field in the glass sheet 90 may be redistributed such that the score line 92 continues to grow through the thickness of the glass sheet 90, forming a through-body crack 95 along the path of formation of the score line 92. The through-body crack 95 terminates at an unseparated portion 97 of the glass sheet 90 located proximate to the second edge 99 of the glass sheet 90. The unseparated portion 97 corresponds to the portion of the glass sheet located proximate to the second edge 99 that was not scored in the scoring operation described hereinabove.

Figure 10:
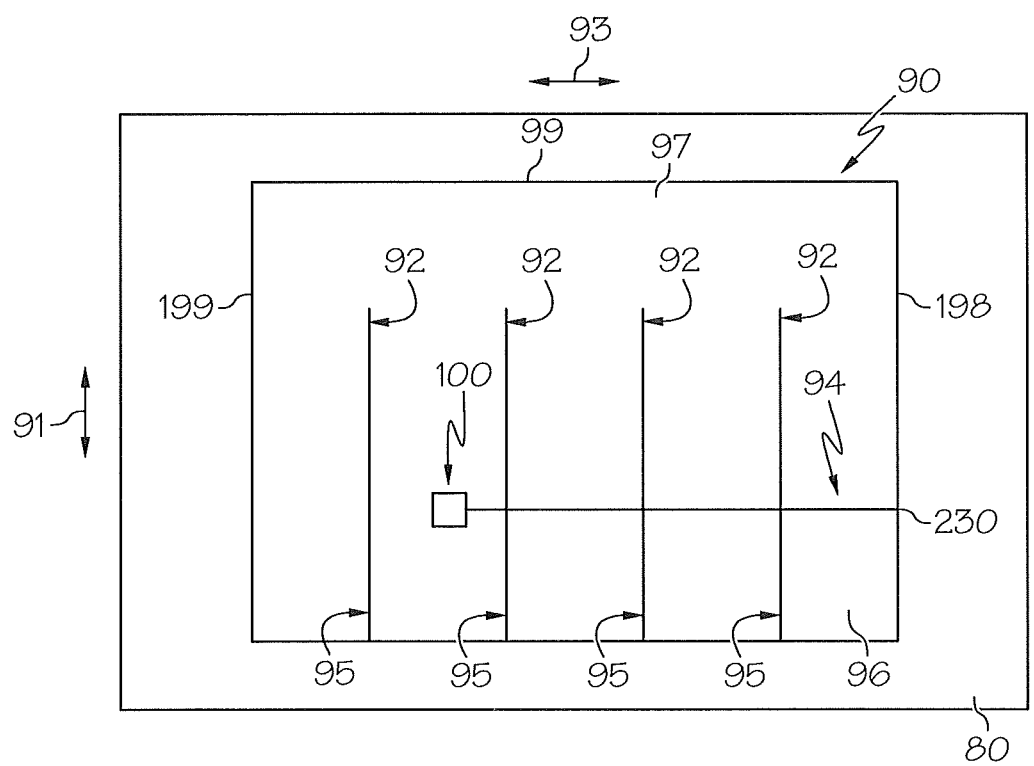
FIG. 10 schematically depicts a top view of the mechanical scoring process of a glass sheet according to one or more embodiments shown or described herein.

Referring now to FIG. 10, the scribing mechanism 100 translates the serrated scribing wheel 110 along the glass sheet 90 a plurality of times such that the serrated scribing wheel 110 forms a corresponding plurality of score lines 92 in the first direction 91. The plurality of score lines 92 continues to grow through the thickness of the glass sheet 90 such that they form a corresponding plurality of through-body cracks 95 that are spaced apart from the second edge 99 by the unseparated portion of the glass sheet 90. With the desired number of score lines 92 formed in the glass sheet 90 in the first direction 91, the scribing mechanism 100 moves the serrated scribing wheel 110 to a position proximate to a third edge 198. Similar to the method discussed hereinabove, the serrated scribing wheel 110 is positioned at a vertical position below the top surface 96 of the glass sheet 90. The scribing mechanism 100 translates the scribing head 120 towards the glass sheet 90 such that the serrated scribing wheel 110 contacts the third edge 198 of the glass sheet 90 in an edge crash mode to initiate a cross-cut crack initiation site 230 at the third edge 198. The scribing mechanism 100 translates the serrated scribing wheel 110 towards the third edge 198 at a cross-cut initiation speed. As the serrated scribing wheel 110 contacts the third edge 198 of the glass sheet 90, the serrated scribing wheel 110 is allowed to translate vertically upwards such that the serrated scribing wheel 110 contacts the top surface 96 of the glass sheet 90. The cross-cut crack initiation site 230 includes surface indentations formed by the serrated scribing wheel 110 that extend into the first strengthened surface layer 142 of the glass sheet 90 similar to those shown in FIGS. 7 and 8.

Referring again to FIG. 10, with the scribing head 120 positioned such that serrated scribing wheel 110 contacts the top surface 96 of the glass sheet 90, the serrated scribing wheel 110 is accelerated in the second direction 93 to a cross-cut scoring speed to scribe a cross-cut score line 94 across the glass sheet 90 towards a fourth edge 199. The cross-cut score line 94 extends a cross-cut median crack depth into the glass sheet 90 that is deeper than the first strengthened surface layer 142 of the glass sheet 90, similar to the median crack depth 148 in FIGS. 7 and 8. In some embodiments, the cross-cut score line 94 extends across a portion of the glass sheet 90. In other embodiments, the cross-cut score line 94 extends across the entirety of the glass sheet 90 from the third edge 198 to the fourth edge 199. A plurality of cross-cut score lines 94 may be formed across the glass sheet 90, according to the end-use application.

Figure 11:
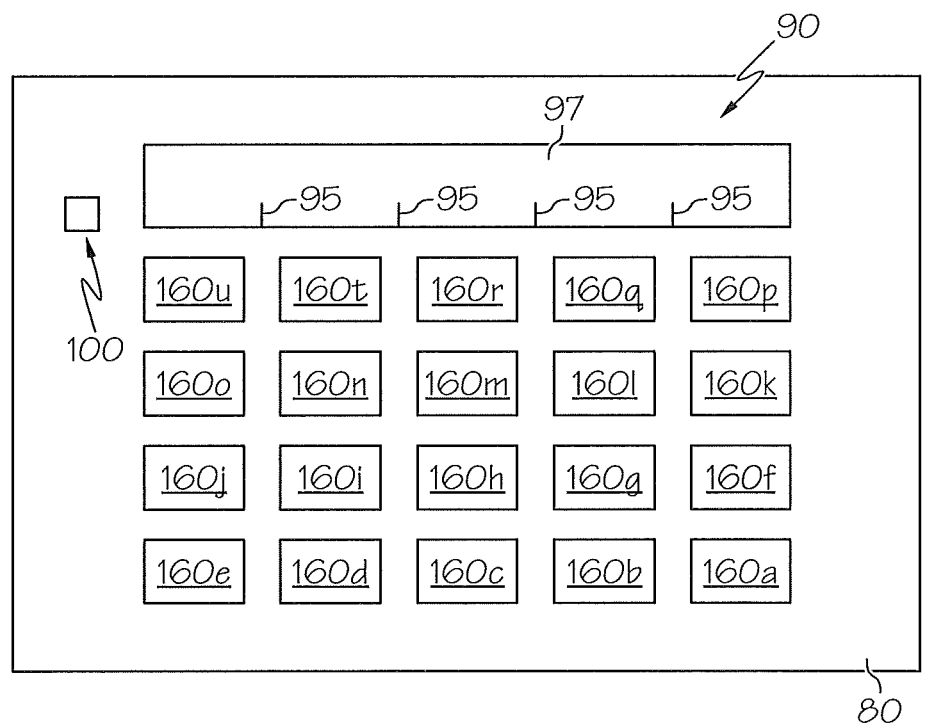
FIG. 11 schematically depicts a top view of the mechanical scoring process separating a glass sheet into a plurality of glass articles according to one or more embodiments shown or described herein.

Referring now to FIGS. 10 and 11, after the serrated scribing wheel 110 is translated away from a local area of interest, each cross-cut score line 94 continues to grow through the thickness of the glass sheet 90, such that the cross-cut score lines 94 form through-body cracks through the glass sheet 90. As the cross-cut score lines 94 grow through the thickness of the glass sheet 90, the glass sheet 90 separates along the through-body cracks 95 at positions corresponding to the score lines 92 and the cross-cut score lines 94. By scoring the glass sheet 90 according to the methods described hereinabove, the glass sheet 90 is separated into a plurality of glass articles 160a-u each having a size and shape determined by the spacing between adjacent score lines 92 and cross-cut score lines 94.

The glass articles 160 may separate from the glass sheet 90 without applying additional force to the glass sheet 90 to separate along the score lines 92 and the cross-cut score lines 94. Further, the glass articles 160 may separate sequentially from the glass sheet 90 in the order in which they are scribed. For example, glass articles 160a-e separate from the glass sheet 90 before glass articles 160f-j, which separate from the glass sheet 90 before glass articles 160k-160o, which separate from the glass sheet 90 before glass articles 160p-160u.

The methods described hereinabove are used to mechanically score strengthened glass sheets 90. The glass sheet 90 may be formed from an alkali aluminosilicate glass composition. In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≥2 mol %; 2 mol %≤$Na_2O$–$Al_2O_3$≤6 mol %; and 4 mol %≤($Na_2O$+$K_2O$)–$Al_2O_3$≤10 mol %.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$(mol %)+$B_2O_3$ (mol %)/(Σ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$(mol %)+$R_2O$(mol %))/$M_2O_3$(mol %)]≤1.2, where $M_2O_3$=$Al_2O_3$+$B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$.

In still other embodiments, the alkali aluminosilicate glass comprises at least about 4 mol % $P_2O_5$, wherein ($M_2O_3$(mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein −340+27.1·$Al_2O_3$−28.7·$B_2O_3$+15.6·$Na_2O$−61.4·$K_2O$+8.1·(MgO+ZnO)≥0 mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

As previously described herein, the glass sheet 90, in one embodiment, is chemically strengthened by an ion exchange process in which ions in the surface layer of the glass are replaced by larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Tl^+$, $Cu^+$, or the like.

The ion-exchange process creates a compressive stress at the surfaces of the glass substrate. These compressive stresses extend beneath the surface of the glass substrate to a certain depth, referred to as the depth of layer. The compressive stresses are balanced by a layer of tensile stresses (referred to as central tension) such that the net stress in the glass substrate is zero. The formation of compressive stresses at the surface of the glass substrate makes the glass strong and resistant to mechanical damage and, as such, mitigates catastrophic failure of the glass substrate for flaws which do not extend through the depth of layer.

In one embodiment, the glass sheet 90 is chemically strengthened by ion-exchange in which smaller sodium ions near the surface of the glass are exchanged with larger potassium ions when the glass sheet 90 is placed in an ion exchange bath. Replacement of the smaller sodium ions with the larger potassium ions causes a layer of compressive stress to develop in the surfaces of the glass sheet 90.

In the embodiments described herein, the compressive stress and depth of layer developed in the glass sheet 90 by strengthening are sufficient to improve the damage tolerance of the glass sheet 90 while also facilitating further processing (such as by polishing or further machining) without risk of introducing flaws into the glass article. In one embodiment, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In one embodiment, the depth of layer may be from about 10 microns to about 80 microns. In another embodiment, the depth of layer may be from about 30 microns to about 60 microns. In yet another embodiment, the depth of layer may be from about 40 microns to about 60 microns.

Glass sheets processed according to the methods described hereinabove are scored using a mechanical scoring process. The mechanical scoring process uses a serrated scribing wheel to form score lines and cross-cut score lines in the glass sheet that extend a median crack depth into the glass sheet. As the serrated scribing wheel is translated away, the score line extends through the thickness of the glass sheet thereby forming a full-body crack that does not reach the far edge of the glass sheet. The serrated scribing wheel is similarly translated across the glass sheet in a second direction transverse to the first direction to form a cross-cut score line. The glass sheet separates without further application of force into a plurality of glass articles sized according to the spacing between adjacent score lines and cross-cut score lines.

EXAMPLE

Chemically strengthened glass sheets were mechanically scored and separated according to the methods described hereinabove. The glass sheets were Corning IOX-FS glass having a thickness of 0.55 millimeters having surface compression layers of 30 μm thickness and a surface compressive stress level of 750 MPa, with a calculated sheet central tension of 33 MPa. The glass sheets were sectioned into smaller glass articles, each having dimensions of 50 millimeters by 50 millimeters. Each sheet was mechanically scribed in accordance with the method described herein utilizing a commercial abrasive glass cutting machine, i.e., a MP Series glass cutting machine commercially obtained from MDI Schott Advanced Processing GmbH of Mainz, Germany. The serrated scribing wheel used for scoring the surfaces of the glass sheets was a Micro Penett 360-3/110°/D2.0 T 0.65 H0.8 also from MDI Schott.

To provide crack initiation sites in the glass sheets, the serrated scribing wheel was edge crashed by positioning the serrated scribing wheel to be about 5 millimeters away from the glass sheet at an incision depth of 0.15 millimeters below the top surface of the glass sheet. The serrated scribing wheel was translated at an initiation speed of 5 millimeters per second to edge crash the glass sheet for a distance of about 5 millimeters from the edge. The serrated scribing wheel was accelerated to a scribing speed of about 250 millimeters per second to form the score line across the majority of the glass sheet at machine pressures of 0.03, 0.04, 0.05, and 0.06 MPa. The machine pressures correspond to normal loads imparted by the serrated scribing wheel onto the glass sheets of 3, 4, 5, and 6 Newtons, respectively. Translation of the serrated scribing wheel along the glass sheets was terminated with the serrated scribing wheel at approximately 3 times the serrated scribing wheel diameter, or about 6 millimeters from the edge.

The glass sheets were cross-cut using the same machine and serrated scribing wheel. Parameters of the edge crash mode forming the cross-cut initiation sites for the cross-cut score lines were consistent with the initiation sites for the score lines. However, the cross-cut scoring speed was about 93% of the scoring speed, or about 232 millimeters per second.

Optimum results of self-separation of glass articles following mechanical scribing were observed when a normal load of 5 Newtons was applied to the serrated scribing wheel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of scoring a strengthened glass sheet comprising:
    positioning a serrated scribing wheel at a position spaced apart from a first edge of the glass sheet and offset below a top surface of the glass sheet, wherein the glass sheet comprises a surface compression layer of depth DOL and a central region;
    translating the serrated scribing wheel into the first edge of the glass sheet;
    continuing to translate the serrated scribing wheel an engagement distance from the first edge in a first direction at an initiation speed such that the serrated scribing wheel forms a crack initiation site comprising surface indentations extending into the first strengthened surface layer;
    subsequent to translating the serrated scribing wheel into the first edge of the glass sheet and the engagement distance, translating the serrated scribing wheel upward in a vertical direction such that contact surfaces of the serrated scribing wheel contact the top surface of the strengthened glass sheet and accelerating the serrated scribing wheel in the first direction from the initiation speed to a scoring speed to scribe a score line extending into the glass sheet to a median crack depth greater than DOL; and stopping the serrated scribing wheel a termination offset distance that is at least greater than a diameter of the serrated scribing wheel before the score line reaches a second edge of the glass sheet that is opposite the first edge, wherein the score line is completed in a score time measured from when the serrated scribing wheel contacts the glass sheet to when the serrated scribing wheel is stopped, and the score line grows through the central region after the score time.

2. The method of claim 1, wherein the score line grows through the glass sheet and forms a through-body crack.

3. The method of claim 1, wherein a stress field within the central region surrounding the fixed position relaxes after the serrated scribing wheel has been translated away from a fixed position, inducing the score line to grow through the central region such that, at the fixed position on the glass sheet, the score line grows through the central region at a time after the serrated scribing wheel has been translated away from the fixed position.

4. The method of claim 1 wherein, the engagement distance is 2 to 4 times the diameter of the serrated scribing wheel.

5. A method of separating a strengthened glass sheet comprising:

positioning a serrated scribing wheel at a position spaced apart from a first edge of the glass sheet and offset below a top surface of the glass sheet, wherein the glass sheet is an ion-exchanged glass sheet having a first strengthened surface layer and a second strengthened surface layer under a compressive stress and extending from a surface of the ion-exchanged glass sheet to a depth of layer DOL, and a central region between the first strengthened surface layer and the second strengthened surface layer that is under tensile stress;

translating the serrated scribing wheel into the first edge of the glass sheet;

continuing to translate the serrated scribing wheel an engagement distance from the first edge in a first direction at an initiation speed such that the serrated scribing wheel forms a crack initiation site comprising surface indentations extending into the first strengthened surface layer;

subsequent to translating the serrated scribing wheel into the first edge of the glass sheet and the engagement distance, translating the serrated scribing wheel upward in a vertical direction such that contact surfaces of the serrated scribing wheel contact the top surface of the strengthened glass sheet and accelerating the serrated scribing wheel in the first direction from the initiation speed to a scoring speed to scribe a score line extending into the glass sheet to a median crack depth greater than DOL;

stopping the serrated scribing wheel a termination offset distance that is at least greater than a diameter of the serrated scribing wheel before the score line reaches a second edge of the glass sheet that is opposite the first edge;

positioning the serrated scribing wheel at a position spaced apart from a third edge of the glass sheet and offset below the top surface of the glass sheet;

translating the serrated scribing wheel in a second direction transverse to the first direction at a cross-cut initiation speed such that the serrated scribing wheel forms a cross-cut crack initiation site comprising surface indentations extending into the first strengthened surface layer; and accelerating the serrated scribing wheel in the second direction from the cross-cut initiation speed to a cross-cut scoring speed to scribe a cross-cut score line extending into the glass sheet a cross-cut median crack depth.

6. The method of claim 5, wherein at a fixed position on the glass sheet, the score line grows through the central region at a time after the serrated scribing wheel has been translated away from the fixed position.

7. The method of claim 6, wherein a stress field within the central region surrounding the fixed position relaxes after the serrated scribing wheel has been translated away from the fixed position, inducing the score line to grow through the central region.

8. The method of claim 5, further comprising scoring a plurality of spaced score lines in the first direction from a plurality of crack initiation sites from the first edge.

9. The method of claim 8, wherein the glass sheet is separated into glass portions along the cross-cut score line and the plurality of score lines.

10. The method of claim 5, further comprising scoring a plurality of cross-cut score lines in the second direction from a plurality of cross-cut crack initiation sites from the third edge.

11. The method of claim 5, wherein after the serrated scribing wheel is accelerated to the scoring speed, applying a normal force to the serrated scribing wheel in a direction towards the top surface of the glass sheet.

12. The method of claim 5, wherein the glass sheet has a thickness of less than 1.5 mm.

13. The method of claim 5, wherein the serrated scribing wheel applies a force to the glass sheet that is less than 6 Newtons.

14. A method of separating a strengthened glass sheet comprising:

positioning a serrated scribing wheel at a position spaced apart from a first edge of the glass sheet and offset below a top surface of the glass sheet, wherein the glass sheet is an ion-exchanged glass sheet having a first strengthened surface layer and a second strengthened surface layer under a compressive stress and extending from a surface of the ion-exchanged glass sheet to a depth of layer DOL, and a central region between the first strengthened surface layer and the second strengthened surface layer that is under tensile stress;

translating the serrated scribing wheel into the first edge of the glass sheet;

continuing to translate the serrated scribing wheel an engagement distance from the first edge in a first direction at an initiation speed such that the serrated scribing wheel forms a crack initiation site comprising surface indentations extending into the first strengthened surface layer;

subsequent to translating the serrated scribing wheel into the first edge of the glass sheet and the engagement distance, translating the serrated scribing wheel upward in a vertical direction such that contact surfaces of the serrated scribing wheel contact the top surface of the strengthened glass sheet and accelerating the serrated scribing wheel in the first direction from the initiation speed to a scoring speed to scribe a score line extending into the glass sheet to a median crack depth greater than DOL;

stopping the serrated scribing wheel a termination offset distance that is at least greater than a diameter of the serrated scribing wheel before the score line reaches a second edge of the glass sheet that is opposite the first edge, wherein the score line is completed in a score time measured from when the serrated scribing wheel contacts the glass sheet to when the serrated scribing wheel is stopped, and the score line grows through the central region after the score time;

positioning the serrated scribing wheel at a position spaced apart from a third edge of the glass sheet and offset below the top surface of the glass sheet;

translating the serrated scribing wheel in a second direction transverse to the first direction at a cross-cut initiation speed such that the serrated scribing wheel forms a cross-cut crack initiation site comprising surface indentations extending into the surface compression layer; and accelerating the serrated scribing wheel in the second direction from the cross-cut initiation speed to a cross-cut scoring speed to scribe a cross-cut score line extending into the glass sheet a cross-cut median crack depth.

15. The method of claim 14, further comprising scoring a plurality of spaced score lines in the first direction from a plurality of crack initiation sites from the first edge.

16. The method of claim 15, wherein the glass sheet is separated into glass portions along the cross-cut score line and the plurality of score lines.

17. The method of claim 14, further comprising scoring a plurality of cross-cut score lines in the second direction from a plurality of cross-cut crack initiation sites from the third edge.

18. The method of claim 14, further comprising inducing residual stresses into the glass sheet during the score time, wherein the residual stresses relax after the score time.

19. The method of claim 14, wherein the serrated scribing wheel applies a force to the glass sheet that is less than 6 Newtons.

* * * * *

UNITED STATES PATENT AND TRADEMARK OFFICE
CERTIFICATE OF CORRECTION

PATENT NO. : 10,351,460 B2  
APPLICATION NO. : 13/477391  
DATED : July 16, 2019  
INVENTOR(S) : James William Brown et al.

Page 1 of 1

It is certified that error appears in the above-identified patent and that said Letters Patent is hereby corrected as shown below:

On the Title Page

In Column 1, item (75), Inventors, Line 3, delete "Joseph," and insert -- Joseph --, therefor.

In the Claims

In Column 13, Line 27, Claim 4, delete "1 wherein," and insert -- 1, wherein --, therefor.

Signed and Sealed this  
Twenty-sixth Day of May, 2020

Andrei Iancu  
*Director of the United States Patent and Trademark Office*